United States Patent

Bieringer et al.

[15] 3,635,437
[45] Jan. 18, 1972

[54] DAMPING MEANS FOR CONTROL LEVERS

[72] Inventors: Harold F. Bieringer, Peoria; Lloyd D. Finley, Lockport; William R. Stary, Peoria, all of Ill.

[73] Assignee: Caterpillar Tractor Co., Peoria, Ill.

[22] Filed: Apr. 22, 1970

[21] Appl. No.: 30,810

[52] U.S. Cl. ............................................. 251/48, 188/322
[51] Int. Cl. ............................................. F16k 31/48
[58] Field of Search ..................... 251/50, 48; 188/322

[56] References Cited

UNITED STATES PATENTS

| 622,418 | 4/1899 | Croswell | 251/48 X |
| 478,963 | 7/1892 | Hankenhof | 251/48 X |
| 477,716 | 6/1892 | Turner | 251/48 X |

*Primary Examiner*—Arnold Rosenthal
*Attorney*—Fryer, Tjensvold, Feix, Phillips & Lempio

[57] ABSTRACT

The disclosed embodiment of the invention is a damper for control mechanisms which are employed in hydraulically controlled implements and which are normally subject to violet forces during portions of an operating cycle. In hydraulically controlled implements, certain operations which are initiated by an operator can be terminated automatically by means of a kickout circuit. A control lever, if moved to an actuated position by the operator, can be returned to a neutral position by the kickout circuit. Excessively high forces may be generated when the control lever is returned to its neutral position, which forces are transmitted to the control level and can be imparted to any object in its path of travel from its actuated position to its neutral position. The disclosed damper substantially reduces the transmitted forces and is generally formed of a cylinder having a closed end and a piston mounted for reciprocal movement therein and pivotally secured to the control lever. The diameter of the piston is slightly less than the diameter of the bore of the cylinder to permit relatively unrestricted movement therebetween. The cylinder is immersed in the hydraulic fluid contained in the hydraulic fluid tank and employs that fluid for developing a pressure gradient from one side of the piston to the other side thereof whenever a large force is applied to the piston to move it within the cylinder.

3 Claims, 1 Drawing Figure

PATENTED JAN 18 1972
3,635,437
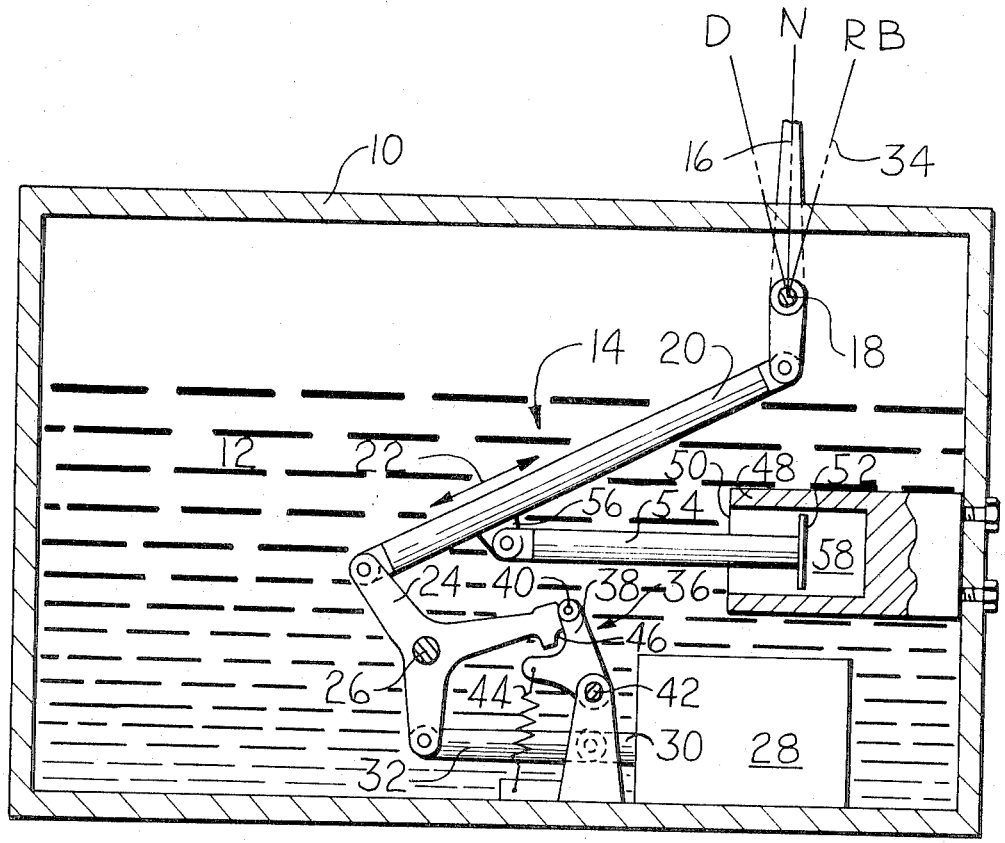
INVENTORS
HAROLD F. BIERINGER
LLOYD D. FINLEY
WILLIAM R. STARY
BY
Fryer, Tjensvold, Feix, Phillips & Lempio
ATTORNEYS

DAMPING MEANS FOR CONTROL LEVERS

This invention relates generally to a damping device for control levers on hydraulically controlled implements and more particularly to a device for damping excessively large forces which may be transmitted to a control lever when a control valve associated therewith is automatically returned from an activated position to a neutral position, such as under the control of a kickout circuit.

In bucket loaders and like hydraulic implements, hydraulic control circuits are employed for directing hydraulic fluid flow to and from a fluid motor or fluid actuator. During actuation of the fluid motor, an operation, such as a change in the position of the bucket, is effected. In order to permit maximum use of an operator's time, additional control circuits are employed which, after a control lever is moved to an actuated position, automatically return the control mechanism to a neutral position when the operation is completed. Such control circuits are referred to as "kickout" circuits.

When the operator of the vehicle operates the work implement, for example a loader bucket to a rackback position, the control mechanism may be automatically locked so that the operator can direct his attention elsewhere while the empty bucket is being returned to the leveled position. The automatic kickout circuit becomes operable when the bucket reaches the level position and is effective to return the control lever to a neutral position without the operator's attention. However, when such automatic kickout is effective, the control lever can often times be returned to the neutral position with considerable force because of the valve centering spring force and excessive hydraulic flow forces developed within the control valve acting thereon. In some instances, the operator can be injured if his hands or other parts of his body are in the path of travel of the control lever during its return to the neutral position.

This problem has been overcome in the past by redesigning the control valve to incorporate a suitable damping means on the ends of the control spools or by redesigning the control valve spools to reduce the flow forces which can be developed therein. However, such reconfiguration of the control valves requires extensive changes and results in a relatively expensive and complicated control valve mechanism. For example, one such control valve mechanism known in the prior art employs a hydraulic motor which introduces into or releases from a control chamber hydraulic fluid, such that it acts on a control surface of the spool of the control valve to position the spool. The hydraulic motor is effective to convey such hydraulic fluid at a rate determined by the position of the spool with respect to the outlet ports of the control valve. It can be appreciated that such additional hydraulic motor means constitute expense and complicated additions to the control valve.

Accordingly, it is an object of the present invention to provide a damping means for a hydraulic control mechanism which is effective to isolate excessive forces applied to a control lever from a control valve associated therewith.

It is another object of the present invention to provide a damping means for a hydraulic control mechanism which is relatively inexpensive and uncomplicated compared to prior art damping devices.

A feature of the present invention resides in the provision of a damping means which employs the hydraulic fluid contained within the hydraulic fluid tank as a damping medium.

These and other objects and features of the present invention are accomplished by means of a cylinder immersed in the hydraulic fluid contained in the hydraulic fluid tank and a piston cooperating therewith, which piston is secured to the control mechanism. Sufficient clearance is provided between the outer peripheral surface of the piston and the bore of the cylinder to permit restricted fluid flow therebetween. Any force in the control mechanism is transmitted to the piston to create a pressure gradient in the hydraulic fluid which passes from one side of the piston to the other side thereof within the bore of the cylinder. Accordingly, a distinct advantage is provided by a relatively simple and inexpensive damping means which is effective to isolate excessive forces which may be transmitted to a control lever of the hydraulic control mechanism.

The invention, as well as other objects, features and advantages thereof will be more readily understood from the following detailed description when taken in conjunction with the accompanying drawing, which illustrates in a single FIGURE a preferred embodiment of the present invention.

With reference to the drawing in detail, there is diagrammatically illustrated a hydraulic fluid tank 10 which contains hydraulic fluid, generally designated with the reference numeral 12, and a control mechanism 14 supported therein. The control mechanism 14 includes a control lever 16 which is pivotally supported on a shaft 18 which is, in turn, secured to the tank 10. The control lever 16 extends through a wall of the tank 10 to permit movement thereof by an operator. One end of the lever 16 is journaled in one end of a connecting linkage 20, such that movement of the lever 16 will operate the linkage 20 generally in the two directions indicated by the double headed arrow 22. The other end of the linkage 20 is pivotally mounted to an arm of a lever assembly 24. The lever assembly 24 is mounted for rotational movement on a shaft 26 which is, in turn, secured to the housing 10. Accordingly, movement of the linkage 20 will cause rotation of the lever assembly 24.

A control valve 28 is mounted within the tank 10 and is immersed within the hydraulic fluid 12 contained therein. The spool 30 of the valve 28 is connected, by means of a connecting linkage 32, to another arm of the lever assembly 24. Accordingly, when the control lever 16 is moved to or from a neutral position to cause movement of the linkage 20 in one of the two directions, the lever assembly 24 will rotate in either a clockwise or counterclockwise direction, resulting in a change in the position of the spool 30 within the control valve 28.

If the control lever 16 is moved to a rackback position, indicated by the phantom line designated with the reference numeral 34, the lever assembly 24 will be rotated in a counterclockwise direction, causing a detent assembly 36 to lock the entire control lever mechanism in such position.

The detent assembly 36 includes an arm 38 which supports a roller 40 on one end thereof and is supported on a shaft 42. The arm 38 is biased in a counterclockwise direction by means of a spring 44. When the lever assembly 24 is rotated in a counterclockwise direction, the roller 40, by the action of the spring 44, will be received into a notch 46 formed on another arm of the lever assembly 24. The bias applied by the spring 44 will hold the roller 40 into the detent 46, thereby locking the control lever 16 and the spool 30 in the rackback position.

A cylinder 48 is secured to a sidewall of the tank 10 and is immersed below the level of the hydraulic fluid 12. The cylinder 48 is open at one end 50 thereof to receive hydraulic fluid therein. A piston 52 is secured to one end of a link 54, the other end of which is journaled in a boss 56 supported on the linkage 20. The cylinder 48 and piston 52 form a chamber 58 which is substantially closed, except for the restricted passage formed by the clearance between the outer peripheral surface of the piston 52 and the diameter of the bore of the cylinder 48.

If the control lever 16 is moved to the rackback position 34, the piston 52 will be moved outwardly of the chamber 58 and the detent assembly 36 will lock the entire control mechanism in that position. When the tilt cylinder and loader bucket (both of which are not shown) reach a desired position in the rackback condition, a kickout mechanism is activated, which kickout mechanism may be similar to that disclosed by U.S. Pat. No. 3,429,471. The kickout mechanism will, by either mechanical or hydraulic action rotate the shaft 42 which is secured to the arm 38 of the detent assembly 36. Such rotation of the shaft 42 in a clockwise direction will rotate the arm 38 in a clockwise direction to remove the roller 40 from the notch 46. When the lever assembly 24 is no longer restricted by the roller 40, the centering spring assembly (not shown) and flow forces within the control valve 28 will cause the spool 30 to be moved to its neutral position which will, in turn, move the control lever 16 to its neutral position. However, such action by the control valve 28 can impart considerable force to the control lever 16, which force is an accumulation of the forces produced by the centering springs within the valve 28 and the flow force therein. However, the damping action which results when the piston 52 is moved inwardly of the chamber 58 will counteract such forces. When the piston 52 is moved inwardly of the chamber 58, fluid therein is compressed, thereby creating a pressure gradient from one side of the piston to the other side thereof. Such pressure gradient can only be relieved by the passage of fluid from the chamber 58. It can be appreciated that the clearance between the outer peripheral surface of the piston 52 and the bore of the cylinder 48 can be established to provide the desired rate of movement of the piston 52 as the valve spool 30 returns to its neutral position.

Because of the free volume within the tank 10, the hydraulic fluid 12 which is not contained within the chamber 58 is not subject to any compressive action by movement of the piston 52. Accordingly, when the piston 52 moved outwardly of the chamber 58, the pressure gradient which is created is less than that created when the piston 52 is moved inwardly of the chamber 58 by a like amount. Accordingly, movement of the control lever 16 to the rackback position from the neutral position requires less force than the same movement in the opposite direction. This advantage of the damping device disclosed herein can be readily achieved, since present work implements utilize hydraulic fluid tanks, which form reservoirs for hydraulic fluid employed by control valves and mechanisms.

Such reservoir of hydraulic fluid permits the use of a damping device such as that disclosed herein and establishes a relatively unconstrained source of hydraulic fluid at a constant pressure for the damping device.

As shown in the drawing, the piston 52 is relatively narrow, such that a slight rotation thereof will not result in its binding within the bore of the cylinder 48. In one example of the implementation of the present invention, a diametrical clearance between the outer peripheral surface of the piston 52 and the bore of the cylinder 48 of 0.016 inch was established.

What is claimed is:

1. A hydraulic implement assembly, comprising a tank containing hydraulic fluid, a control valve mounted in said tank and immersed below the level of said fluid, a lever assembly having a plurality of arms and mounted for rotational movement with respect to said tank, a control lever connected to one arm of said lever assembly, means connecting another arm of said lever assembly to a spool of said control valve, means for locking said lever assembly in an active position, means for releasing said locking means, and a damper connected to said control lever and including means for permitting greater relative movement of said control lever in one direction than in an opposite direction.

2. A hydraulic implement assembly as defined in claim 1, wherein said means of said damper includes a receptacle immersed below the level of fluid in said tank and a piston disposed for slidable movement in said receptacle and forming a chamber therewith for constraining hydraulic fluid therein, said piston being connected to said control lever.

3. A hydraulic implement assembly including a tank containing hydraulic fluid, a control valve immersed in the fluid within the tank, and a control lever connected to the control valve, the improvement comprising a mechanism for holding the control lever in certain of its operating positions, a kickout mechanism connected to the control lever for returning the lever from an active position to a neutral position, means immersed in the hydraulic fluid in the tank and forming a receptacle having one open end for receiving the hydraulic fluid therein and one closed end, a member mounted for relative movement in said receptacle and means connecting said member to the control lever, said member forming a restricted passage with walls of said receptacle for the hydraulic fluid retained therein, the remaining fluid in the housing being relatively unconstrained, such that a pressure gradient is created across said member when said member is moved inwardly of said chamber in response to the kickout mechanism which is greater than the pressure gradient created when said member is moved outwardly of said chamber.

* * * * *